United States Patent [19]

Ishibashi et al.

[11] Patent Number: 4,771,416
[45] Date of Patent: Sep. 13, 1988

[54] CENTERING APPARATUS FOR INFORMATION RECORDING DISK

[75] Inventors: Masaya Ishibashi; Masaaki Kiyomiya, both of Saitama, Japan

[73] Assignee: Pioneer Electronic Corporation, Tokyo, Japan

[21] Appl. No.: 81,214

[22] Filed: Aug. 4, 1987

[30] Foreign Application Priority Data

Aug. 4, 1986 [JP] Japan .................................. 61-183854

[51] Int. Cl.⁴ .......................... G11B 3/62; G11B 17/00
[52] U.S. Cl. ..................................... 369/270; 369/194; 369/199
[58] Field of Search ................ 369/270, 271, 194, 199

[56] References Cited

U.S. PATENT DOCUMENTS

| | | | |
|---|---|---|---|
| 3,260,529 | 7/1966 | Brown | 369/270 |
| 4,420,830 | 12/1983 | Green | 369/270 |
| 4,510,592 | 4/1985 | Kanamara et al. | 369/270 |

*Primary Examiner*—Steven L. Stephan
*Attorney, Agent, or Firm*—Sughrue, Mion, Zinn, Macpeak & Seas

[57] ABSTRACT

A centering apparatus for a disk having two circular recording substrates joined together with respective center holes which may be misaligned. A first and a second centering member center respectively the two disks and a mechanical actuating rod in a single motion moves the second centering member radially outward into engagement with center hole of the second substrate and presses the first centering member axially out of engagement with the center hole of the first substrate.

4 Claims, 3 Drawing Sheets

CENTERING APPARATUS FOR INFORMATION RECORDING DISK

BACKGROUND OF THE INVENTION

1. Field of the Invention

The present invention relates to a centering apparatus for an information recording disk. It particularly relates to a centering apparatus for performing centering of a disk which is constituted by a pair of circularl substrates each having a signal recording layer.

2. Background of the Invention

In the case of an optical information recording disk such as a video disk or a DRAW (direct read after write) disk, information is recorded in the form of numbers of fine pits by use of a laser light spot. Therefore, it is important to protect the layer on which the pits have been formed, that is, a signal recording layer. Therefore, there has been developed a disk for the system in which a pair of circular substrates each having a signal recording layer are combined in opposition to each other with the respective signal recording layers disposed inside.

FIG. 1 shows a centering apparatus for performing centering of a disk relative to a turntable. As shown in FIG. 1, the centering apparatus includes a centering member 4 provided at its outer circumferential portion with a conical taper portion 1 and which is slidably attached to a driving shaft 3 of a turntable 2. A coil spring 5 is provided between the centering member 4 and the turntable 2. A ring stopper 6 prevents the centering member 4 from coming off from the driving shaft 3. A cuplike pressing member 8 clamps a disk 9 onto the turntable 2. The pressing member 8 is rotatably attached to a support member 12 through a ball 10 and a ball socket 11 so as to be made to come into contact with or separate from the disk 9 mounted on the turntable 2.

As described above, the disk 9 is constituted by a pair of circular substrates 13 and 14 each having a signal recording layer and a central hole. The substrates 13 and 14 are combined with each other with their signal recording layers disposed on the interior.

In the thus arranged centering apparatus, as shown in the drawing, centering of the disk 9 relative to the turn table 2 is performed by causing the taper portion 1 of the centering member 4 to engage with the central hole of the disk 9. In this state, information reproducing on the signal recording layer of the lower one of the circular substrates 13 is performed by a reproducing portion or optical pickup 16. In the same state without reversing the disk 9, information reproducing of information on the signal recording layer of the other or upper circular substrate 14 is performed by another pickup 17.

In such an apparatus, the two pickups 16 and 17 are provided corresponding to the respective signal recording layers of the circular substrates 13 and 14 so as to perform recording and reproducing on the respective signal recording layers without reversing the disk 9. However, in such an apparatus the following problem occurs in the case where the circular substrates 13 and 14 forming the disk 9 as shown in the drawings are combined with a radial displacement relative to each other of a distance e. That is, although reproducing on the signal recording layer of the lower circular substrate 13 abutting on the disk holding surface of the turntable 2 is smoothly performed, it is difficult to smoothly perform the reproducing on the signal recording layer of the other circular substrate 14 because the upper circular substrate 14 is rotated under the condition that the central axis of the circular substrate 14 is displaced by e from the rotary central axis of the turntable 2.

SUMMARY OF THE INVENTION

It is therefore an object of the present invention to solve the problem described above.

It is another object of the present invention to provide a centering apparatus in which reproducing and recording on both the respective signal recording layers of a pair of circular substrates constituting an information recording disk can be always smoothly performed even if the circular substrates are displaced from each other.

To attain the above objects, according to the present invention, the centering apparatus is intended for centering of an information recording disk relative to a turntable. The disk is constituted by a pair of circular substrates each having a signal recording layer and a central hole and attached to each other with the signal recording layers disposed inside. The centering apparatus comprises first centering means provided movably along a rotary central axis of the turntable and arranged to engage with the central hole of one of the circular substrates abutting on a disk holding surface of the turntable. Second centering means are provided movably along the disk holding surface and arranged to engage with the central hole of the other of the circular substrates. Driving means alternatively drive a selected one of the first and second centering means to engage with the central hole of corresponding one of the one and the other circular substrates.

BRIEF DESCRIPTION OF THE DRAWINGS

Other objects and advantages of the invention will become apparent during the following discussion of the accompanying drawings wherein.

DETAILED DESCRIPTION OF THE PREFERRED EMBODIMENT

Referring to the accompanied drawings, an embodiment of the centering apparatus according to the present invention will be described hereunder.

Figure 2:
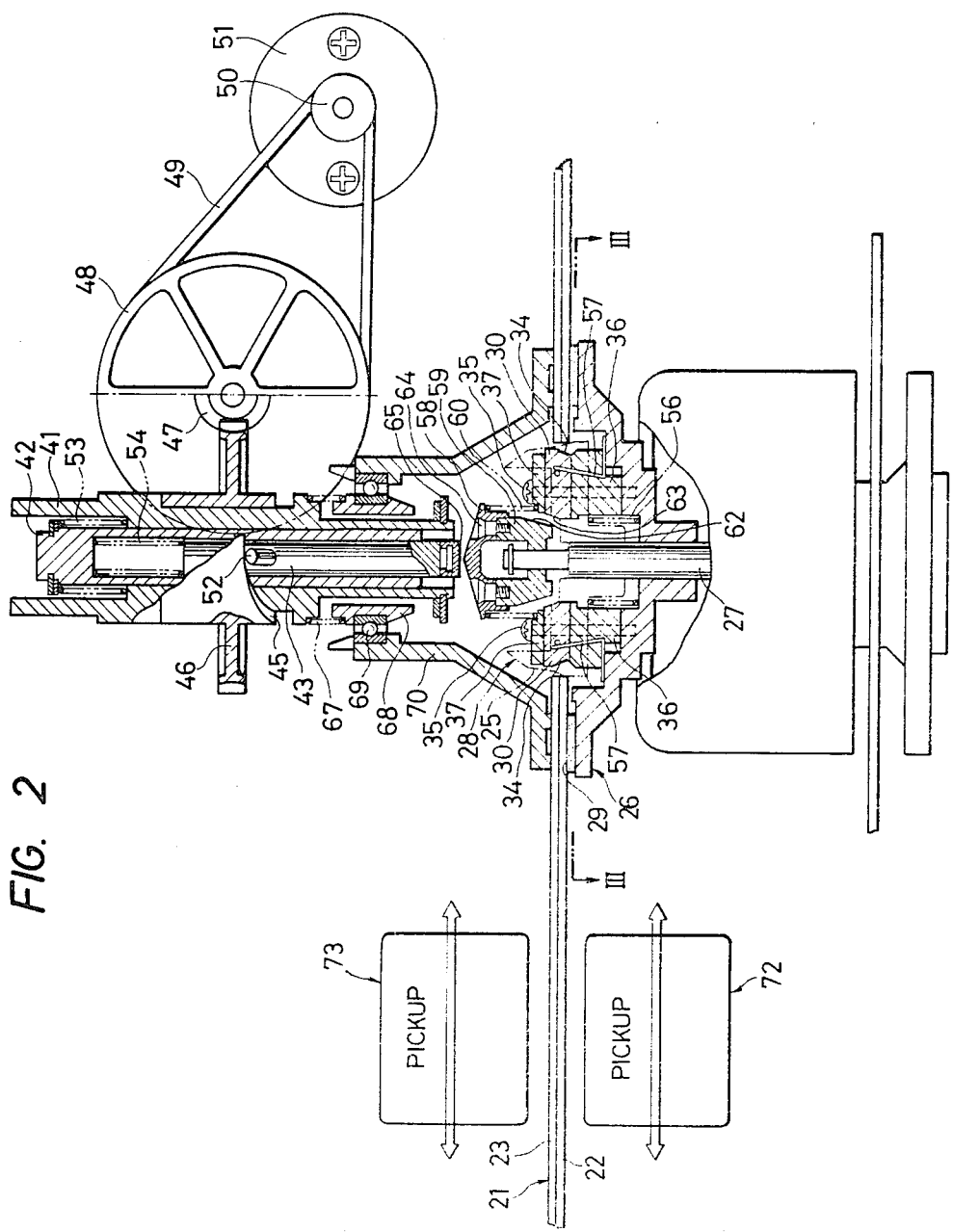
FIG. 2 is a front view partially in section showing the centering apparatus according to the present invention and peripheral members of the same.
Figure 4:
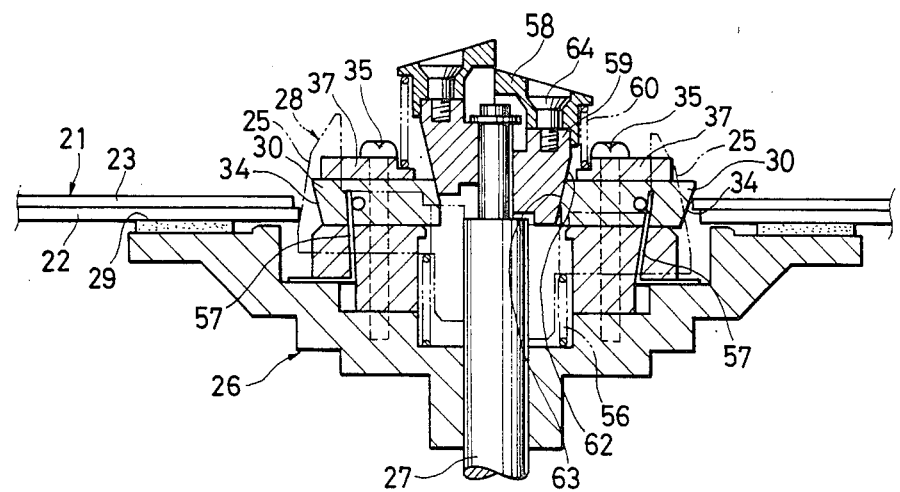
FIG. 4 is a diagram for explaining the operation of the centering apparatus.

As shown in FIG. 2, a disk 21 subject to centering is provided with a pair of circular substrates 22 and 23 each having a signal recording layer and a central hole. The circular substrates 22 and 23 are attached to each other with the signal recording layers disposed inside.

Figure 3:
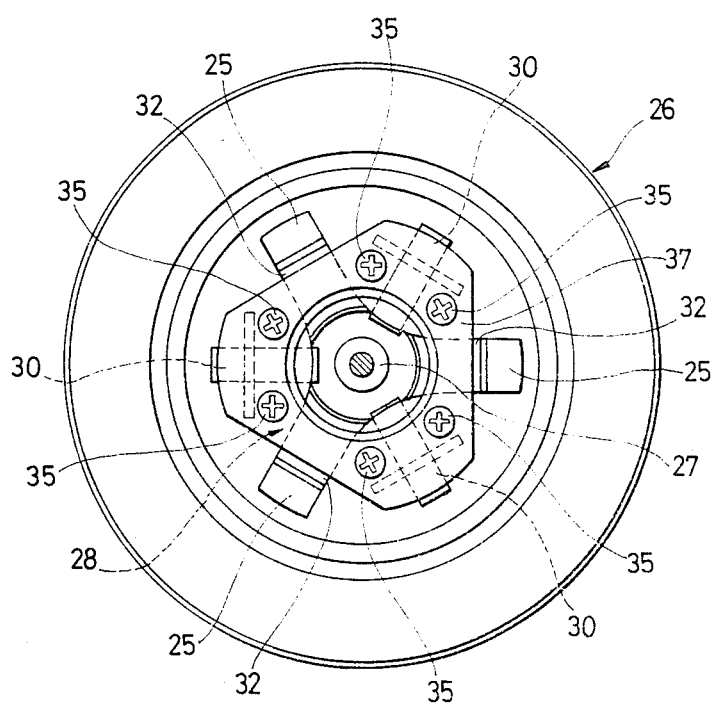
FIG. 3 is a cross-section taken on line III—III in FIG. 2.

As shown in FIGS. 2 and 3, the centering apparatus in provided with a first centering member 28 slidably attached to a driving shaft 27 of a turntable 26 and having taper portions 25 formed at its outer peripheral portions. Three second centering members 30 are arranged so as to be radially reciprocative along a disk holding surface 29 of the turntable 26. As is apparent from FIG. 3, the first centering member 28 is three-forked so as to form three radially extending branch portions 32 separated from each other at an angular pitch of 120 degrees. The taper portions 25 are formed at the tip ends of the respective branch portions 32. The first centering member 28 centers the lower circular substrate 22 relative to the turntable 26 by causing the taper portions 25 to engage with the central hole of the lower circular substrate 22 which is one of the pair of circular substrates 22 and 23 forming the disk 21. The lower circular substrate 22 abuts on the disk holding surface 29 of the turntable 26.

On the other hand, as is apparent from FIG. 2, the three second centering members 30 are arranged so as to extend radially and are separated from each other at an angular pitch of 120 degrees so that each second centering member 30 is sandwiched between adjacent ones of the branch portions 32 of the first centering member 28. Each of the second centering members 30 is movable to reciprocate in the radial direction. As shown FIG. 2, taper portions 34 are formed respectively on the second centering members 30 at their respective outside end portions. The taper portions 34 of the second centering members 30 are inclined oppositely from the taper portions 25 of the first centering member 28. The second centering members 30 center the upper circular substrate 23 relative to the turntable 26 by causing the taper portions 34 to engage with the central hole of the upper circular substrate 23. The second centering members 30 are attached to the turntable 26 through a pedestal 36 and a plate 37 which are connected with each other with screws 35.

Next, a description will be given as to a driving means for driving alternatively the first centering member 28 and the second centering members 30 to cause the first centering member 28 or the second centering members 30 to engage with the central hole of the circular substrate 22 or the central hole of the circular substrate 23 respectively.

As shown in FIG. 2, the driving means includes a substantially cylindrical rod base 41 supported by a support mechanism (not shown) together with the turntable 26. A central rod 43 is slidably provided in the rod base 41 as guided by a rod guide 42. The central axis of the rod 43 is made coincident with the rotary central axis of the turntable 26, that is, the central axis of the driving shaft 27. A worm wheel 46 on which a cam portion 45 is formed is attached to the rod base 41. The worm wheel 46 is driven to rotate by an electric motor 51 through a worm 47, a large pulley 48 formed integrally with the worm 47, a belt 49, and a small pulley 50. The cam portion 45 formed on the worm wheel 46 is slidably in contact with a pin 52 projecting from the above-mentioned rod 43. The cam portion 45 is arranged to move the pin 52 and hence the rod 43 when the worm wheel 46 is rotated. A coil springs 53 is provided between the respective end portions of the rod base 41 and the rod guide 42 and another coil spring 54 is provided between the respective end portions of the rod guide 42 and the rod 43.

On the other hand, as shown also in FIG. 2, a coil spring 56 is provided between the turntable 26 and the first centering member 28. Each of the second centering members 30 is urged by a leaf spring 57 toward the driving shaft 27.

A tip end center cap 58 capable of smoothly touching a bottom end portion of the rod 43 is slidably attached to a top end of the driving shaft 27 together with a center slide 59. The center cap 58 and the center slide 59 are connected to each other with screws 64. The rod 43 is provided at its lower end portion with thrust bearing members 65 which directly contact with the center cap 58. A coil spring 60 is provided between the center cap 58 and the plate 37. The center slide 59 is able to abut at its lower end portion onto the upper end portion of the first centering member 28. A taper portions 62 is formed on the lower end portion of the center slide 59 so as to be engageable with a taper portion 63 formed on the inside end portion of each of the second centering members 30. That is, when the center slide 59 is moved down, its taper portion 62 engages with the taper portion 63 of each of the second centering members 30. Each of the second centering members 30 is arranged to move outward against the urging force of the leaf spring 57 owing to the operation of the taper portions 62 and 63.

The above-mentioned members, that is, the rod base 41, the rod guide 42, the rod 43, the worm wheel 46, the worm 47, the large pulley 48, the belt 49, the small pulley 50, the motor 51, the coil springs 53, 54, and 56, the plate spring 57, the center cap 58, the center corn 59, the coil spring 60, and the screws 64, constitute a driving means for driving alternatively the first centering member 28 and the second centering members 30. The driving means causes the first centering member 28 or the second centering members 30 to engage with the central hole of the circular substrate 22 or the central hole of the circular substrate 23 respectively.

As shown in FIG. 2, a cup-like pressing member 70 is attached to the rod base 51 at its lower end portion through a coil spring 67, an intermediate member 68, and a ball bearing 69. The pressing member 70 is arranged to come into contact with and separate from the disk 21 mounted on the turntable 26 so as to clamp the disk 21 onto the turntable 26 in use.

Next, referring also to FIG. 3, the operation of the centering apparatus described above will be described briefly.

Figure 1:
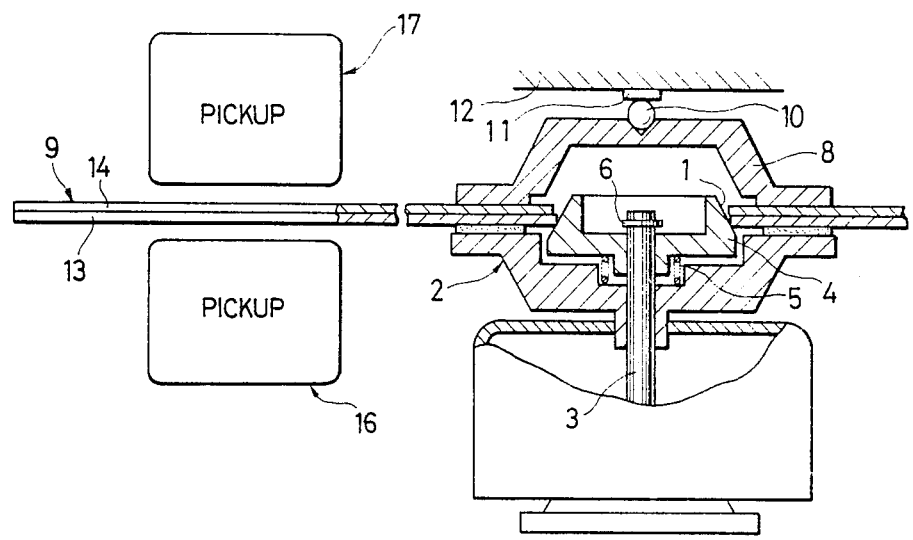
FIG. 1 is a view for explaining the conventional centering apparatus.

First, when information reproducing is to be executed on the signal recording layer on the lower circular substrate 22, that is, on the one of the pair of circular substrates 22 and 23 forming the disk 21 abutting on the disk holding surface 29 of the turntable 26, the taper portions 25 of the first centering member is engaged with the central hole of the lower circular substrate 22 to thereby center the lower circular substrate 22 relative to the turntable 26. In this condition, the information reproducing is executed by a reproducing pickup 72 as illustrated in FIG. 1.

Next, when information reproducing is executed on the signal recording layer of the other or upper circular substrate 23, the motor 51 is driven to rotate the worm wheel 46 so that the rod 43 is moved downward by the pin 52 owing to the operation of the cam portion 45 formed on the worm wheel 46. Accordingly, the center slide 59 is pressed downward together with the center cap 58 to cause the taper portion 62 of the center slide 59 to engage with the taper portions 63 formed at the inside end portions of the respective second centering members 30. Thereby, the second centering member 30 are moved outward so that the taper portions 34 formed at the outside end portions of the respective second centering members 30 are engaged with the central hole of the upper circular substrate 23 as shown in FIG. 3, thereby performing the centering of the circular substrate 23 relative to the turntable 26. On the other hand, at that time, the lower end portion of the center slide 59 presses down the first centering member 28 against the coil spring 56 so as to cause the first centering member 28 to separate from the central hole of the circular substrate 22. In this condition, the signal recording/reproducing is executed on the signal recording layer of the upper circular substrate 23.

Figure 5:
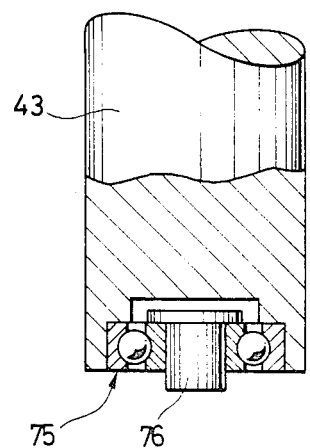
FIG. 5 is a diagram showing a partially modified embodiment of the centering apparatus.

The thrust bearing member 65 in the above embodiment is constituted by the lower end portion of the rod 43 arranged to abut onto the center cap 58 in the embodiment. However, a modification can be made, as shown in FIG. 5, such that a pin 76 is rotatably provided on the lower end portion of the rod 43 through a ball bearing 75 so that the in 76 may be in contact with the center cap 58.

As described above, the centering apparatus, according to the present invention, centers a disk constituted by a pair of circular substrates combined with each other and each having a signal recording layer and a central hole. The centering apparatus comprises a first centering member and second centering members arranged to alternatively engage with central holes of the respective circular substrates, and a driving means for driving alternatively the first centering member and the second centering members to cause the first centering member or the second centering members to engage with the central hole of one of the circular substrate or the central hole of the other circular substrate.

Accordingly, even if the pair of circular substrates are displaced relative to each other, information reproducing on both the signal recording layers of the circular substrates can be always smoothly performed.

We claim:

1. A centering apparatus for centering an information recording disk relative to a turntable, said disk constituted by a pair of circular substrates each having signal recording layer and a central hole and attached to each other with said signal recording layers disposed inside, said apparatus comprising:

first centering means provided movably along a rotary central axis of said turntable and arranged to engage with said central hole of a first one of said circular substrates abutting on a disk holding surface of said turntable.

second centering means provided movably along said disk holding surface and arranged to engage with said central hole of a second one of said circular substrate; and driving means for alternatively actuating one of said first and second centering means to engage with said central hole of a corresponding one of said first and second circular substrates.

2. A centering apparatus as recited in claim 1, wherein said first centering means includes a first abutting surface engaging said central hole of said first circular substrate and inclined to an axis of rotation of said turntable and wherein said second centering means includes a second abutting surface engaging said central hole of said second circular substrate and inclined to said axis in a direction opposite to said first abutting surface.

3. A centering apparatus as recited in claim 2, wherein said second centering means includes three centering members each having one said second abutting surface and being radially movable with respect to said axis.

4. A centering apparatus as recited in claim 2, wherein said driving means includes spring means biasing said first centering means in a first direction along said axis and a rod movable along said axis opposite said first direction to move said three centering members radially outward and to move said first centering means opposite said first direction against said spring means.

* * * * *